June 19, 1928.  1,674,287
F. KURATH ET AL
MOLDED PLASTIC COMPOSITION ARTICLE AND METHOD OF PRODUCING THE SAME
Filed Aug. 17, 1925

Fig.1ª

Fig.2ª

INVENTORS
Frank Kurath
Linwood J.Richardson
BY
ATTORNEY

Patented June 19, 1928.

1,674,287

UNITED STATES PATENT OFFICE.

FRANK KURATH AND LINWOOD T. RICHARDSON, OF MILWAUKEE, WISCONSIN, ASSIGNORS TO THE CUTLER-HAMMER MFG. CO., OF MILWAUKEE, WISCONSIN, A CORPORATION OF WISCONSIN.

MOLDED PLASTIC COMPOSITION ARTICLE AND METHOD OF PRODUCING THE SAME.

Application filed August 17, 1925. Serial No. 50,596.

This invention relates to improvements in molded plastic composition articles and methods of producing the same.

An object of the invention is to provide articles of the above character having a relatively high resistance to impact or strain.

Another object is to provide such characteristics in articles formed of the usual materials including a fibrous filler and an organic binder.

Another object is to provide novel methods of treating the material prior to molding thereof for accomplishment of the desired results.

Another object is to provide a molded plastic composition article having a substantially laminated physical structure which increases the toughness and resistance to breaking thereof.

Other objects and advantages of the invention will hereinafter appear.

Figure 1:
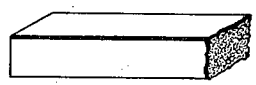
Figure 1:
Figure 2:
Figure 2:

In the accompanying drawing:

Figures 1 and 1ª are perspective and end views, respectively of an article molded from material prepared in the ordinary manner and showing one type of break, and Figs. 2 and 2ª are similar views of an article molded from like material prepared in accordance with our invention, showing the improved physical structure of the article.

In carrying out our invention, we subject a mixture of ordinary molding material, including a fibrous filler and an organic binder to treatment adapted to improve the physical characteristics thereof when molded into articles of various shapes. For example, we may employ a binder having the following ingredients:

| | Parts by weight. |
|---|---|
| Stearine pitch | 1,050 |
| Coal tar pitch (melting point 130 degrees F.) | 945 |
| Gilsonite | 105 |
| Fish oil (or castor oil) | 168 |

The stearine pitch, coal tar pitch and gilsonite are placed in a suitable vessel and heated to 500 degrees F. with stirring, to form a homogeneous mass. The mixture is allowed to cool to about 475 degrees F. and the fish oil (or castor oil) is stirred in. Thereupon a quantity of carbon (about 20 per cent of the weight of coal tar pitch) is precipitated. Thereafter the clear supernatant liquid is drawn off, and to 130 parts thereof are added 32 parts of benzol. As a filler we preferably employ an asbestos which has the following approximate screen analysis when screened on standard Tyler screens:

2.0 per cent remains on 8 mesh screen.
38.0 per cent remains on 20 mesh screen.
21.0 per cent remains on 35 mesh screen.
5.0 per cent remains on 48 mesh screen.
2.5 per cent remains on 65 mesh screen.
1.5 per cent remains on 100 mesh screen.
30.0 per cent passes through 100 mesh screen.

A suitable mix may be made in a kneading machine with:

| | |
|---|---|
| Binder | 39 pounds |
| Asbestos | 150 pounds |
| Sulphur | 9 pounds |
| Iron oxide | 3 pounds |
| Solvent (benzol or coal tar oil | 2 to 4 quarts |

The material when thoroughly mixed in the kneading machine is lumpy, and the lumps are broken by passing the same through an impact mill, which reduces the material to the form of small irregular pellets of the mixture of binder and hair-like asbestos fibers.

The material thus far described is prepared in the ordinary manner and is ready for molding, according to the usual methods and in Figs. 1 and 1ª we have shown an ordinary cold molded and cured article, which has been broken. Due to the physical structure of the molded material a relatively sharp, clean break is obtained and the impact resistance of the molded article is relatively low.

The aforedescribed articles while possessing sufficient toughness or resistance to impact for certain purposes, are nevertheless lacking in the degree of these characteristics required in many instances. We have discovered that the aforementioned difficulties may be overcome by simple mechanical treatment of the molding material aforedescribed prior to the molding operation.

In accordance with one embodiment of our invention, the molding material in pellet or lump form is passed through rolls to form a sheet. This sheet is then disintegrated in any suitable manner, so that the final material is in the form of thin flakes. If desired, of course, the pellets or small lumps may be fed to the rolls in a manner to avoid the formation of a sheet; that is, they may be individually flattened or reduced to flake form, or the same may be passed through shredding rolls to form thread-like particles of the material. Articles molded from the material in flake form are found to have a substantially laminated physical structure, which compels a ragged or uneven break under impact, instead of a relatively sharp, clean break as in ordinary molded articles of this type. In Figs. 2 and 2ᵃ we have shown an article molded from material prepared in accordance with our invention. As indicated the article has a substantially laminated physical structure which causes a ragged or uneven break and thus increases the resistance of the article to impact or breaking strains.

The aforedescribed structure of articles molded from material prepared in accordance with our invention greatly increases the resistance of the articles to impact strains and correspondingly increases the utility of such articles for many purposes.

As aforeindicated, we employ the ordinary or usual molding materials, but the physical structure and arrangement of the particles is so modified as to increase the irregularity of fracture of the molded material, thereby increasing the impact resistance of the finished articles.

What we claim and desire to secure by Letters Patent is:

1. The method of modifying the characteristics of a plastic composition material comprising a fibrous filler and a binder, which comprises attenuating the composite particles thereof prior to molding under pressure.

2. The method of improving the physical characteristics of a cold molding plastic composition embodying an organic binder and a fibrous filler, which comprises reducing the composition to particles of flake form.

3. The method of preparing a plastic molding composition, which comprises mixing a binder with a fibrous filler, rolling the mixture to form a sheet, and then reducing the sheet material to particles of elongate form.

4. The method of preparing a plastic molding composition, which comprises mixing a suitable binder with a fibrous filler, reducing the mixed material to the form of small pellets or particles, and then compressing or rolling the pellets to form the same into flakes.

5. The method of increasing the impact resistance of molded plastic composition articles, which comprises treating a mixture of fibrous filler material and an organic binder to provide particles of the mixture in flake form, and then molding the flaked material.

6. The method of treating a plastic molding composition to increase the impact resistance thereof when molded into the desired shape, which comprises intimately mixing a fibrous filler and an organic binder, reducing the mixed material to flake form, and then molding the flaked material.

7. The method of treating a plastic molding composition to increase the impact resistance thereof when molded into the desired shape, which comprises intimately mixing a fibrous filler and a binder, reducing the mixed material to flake form, and then molding the flaked material in a manner to provide an article having a substantially laminated structure.

8. The method of providing a molded plastic composition article having a relatively high impact resistance, which comprises mixing a fibrous filler and a binder, flaking the mixture and then molding the material in a manner to insure location of all portions of the individual fibers in substantially a single plane 9. A molded fibrous plastic composition article, the constituent composite particles of which have a high degree of overlapping relation in a given plane.

10. A molded article comprising composite particles of maximum surface of contact.

11. A fibrous plastic composition material in flake form.

12. A cold molding fibrous plastic composition material in the form of thin flakes.

13. A plastic composition material adapted to be molded under pressure, comprising an organic binder and a fibrous filler mixed and reduced to flake form.

14. A plastic molding composition material comprising particles of a mixture of an organic binder and a fibrous filler, said particles having been rolled or pressed into flake form.

15. A plastic molding composition material comprising separate particles of a mixture of an organic binder and a fibrous filler, said particles having a structure such as to insure substantially parallel positioning of the fibers of the mixture when subjected to molding pressure.

16. A plastic molding composition material comprising separate particles of a mixture of an organic binder and a fibrous filler, said particles being formed and arranged in a manner to increase the resistance to fracture of an article molded from such material when subjected to an impact force.

17. An article molded from fibrous plastic composition material in flake form.

18. A molded fibrous plastic composition article having a substantially laminated arrangement of its individually formed constituent composite particles.

19. A molded article of relatively high impact resistance, comprising a flaked mixture of an organic binder and a fibrous filler.

20. A cold molded article of high impact resistance molded from separate composite particles of a mixture of an organic binder and a fibrous filler, the particles of said mixture being so arranged with respect to each other as to insure a ragged or uneven break of the molded article.

In witness whereof, we have hereunto subscribed our names.

FRANK KURATH.
LINWOOD T. RICHARDSON.